United States Patent
Woolsey et al.

(10) Patent No.: US 9,992,343 B2
(45) Date of Patent: Jun. 5, 2018

(54) TEXT TRANSLATION OF AN AUDIO RECORDING DURING RECORDING CAPTURE

(71) Applicant: Microsoft Technology Licensing, LLC, Redmond, WA (US)

(72) Inventors: Kerry David Woolsey, Duvall, WA (US); Amit Kumar Dutta, Sammamish, WA (US); Mieszko G. Matkowski, Woodinville, WA (US); Krishnan Ananthanarayanan, Redmond, WA (US); Ganapathy V. Raman, Redmond, WA (US); Mahendra D. Sekaran, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days. days.

(21) Appl. No.: 15/460,510

(22) Filed: Mar. 16, 2017

(65) Prior Publication Data
US 2017/0187882 A1    Jun. 29, 2017

Related U.S. Application Data

(63) Continuation of application No. 14/686,536, filed on Apr. 14, 2015, now abandoned.

(51) Int. Cl.
*H04M 3/53* (2006.01)
*H04M 3/533* (2006.01)
(Continued)

(52) U.S. Cl.
CPC ....... *H04M 3/53333* (2013.01); *G10L 15/265* (2013.01); *H04M 7/003* (2013.01);
(Continued)

(58) Field of Classification Search
CPC .......... H04W 4/12; H04L 29/08; H04L 12/58
(Continued)

(56) References Cited

U.S. PATENT DOCUMENTS 7,035,385 B2    4/2006  LeVine et al.
7,103,154 B1    9/2006  Cannon
(Continued)

OTHER PUBLICATIONS

"International Search Report and Written Opinion", Application No. PCT/US2016/027009, Sep. 6, 2016, 19 pages.
(Continued)

*Primary Examiner* — Kamran Afshar
*Assistant Examiner* — Farideh Madani

(57) ABSTRACT

Various embodiments provide real-time translation of a voicemail into a readable format as the voicemail is being recorded. In some cases, a system server records the voicemail by first answering a call from an originating device that goes unanswered by a destination device. Upon answering the call, the system server translates the recording, while it is being recorded, into a readable format. Alternately or additionally, the system server forwards portions of the readable format to the destination device. In turn, as the destination device receives portion(s) of the real-time translation, it can display the associated content, and/or update what is displayed as new portions are received. At times, the destination device provides additional call control that interrupts the voicemail while it is being recorded at the system server, and redirects the call to the destination device if the originating device is still connected.

33 Claims, 9 Drawing Sheets

(51) Int. Cl.
 *H04W 4/14* (2009.01)
 *H04M 7/00* (2006.01)
 *G10L 15/26* (2006.01)

(52) U.S. Cl.
 CPC ...... *H04W 4/14* (2013.01); *H04M 2203/4536* (2013.01); *H04M 2203/4563* (2013.01)

(58) Field of Classification Search
 USPC .................................. 455/412.1, 412.2, 413
 See application file for complete search history.

(56) References Cited

U.S. PATENT DOCUMENTS

| | | | |
|---|---|---|---|
| 7,164,753 | B2 | 1/2007 | Engelke et al. |
| 8,204,486 | B2 | 6/2012 | Brock et al. |
| 8,249,568 | B2 * | 8/2012 | Salmon ............... H04M 1/7255 379/1.02 |
| 8,259,910 | B2 * | 9/2012 | Afifi .................. H04M 3/42221 379/88.14 |
| 8,325,886 | B1 | 12/2012 | Kirchhoff et al. |
| 8,374,319 | B1 | 2/2013 | Bridges et al. |
| 8,380,515 | B2 | 2/2013 | Garg et al. |
| 8,417,223 | B1 * | 4/2013 | Trivi ................. H04M 3/53366 455/412.1 |
| 8,625,750 | B2 | 1/2014 | Gravino et al. |
| 8,666,034 | B2 | 3/2014 | Christie, IV |
| 8,699,677 | B2 | 4/2014 | Zhou et al. |
| 8,781,080 | B2 | 7/2014 | Hale et al. |
| 2006/0223502 | A1 | 10/2006 | Doulton |
| 2007/0263605 | A1 * | 11/2007 | Estevez ............... H04L 12/5692 370/356 |
| 2008/0260114 | A1 * | 10/2008 | Siminoff ............. H04M 3/5322 379/88.14 |
| 2009/0028304 | A1 | 1/2009 | Burckart et al. |
| 2011/0013756 | A1 | 1/2011 | Davies et al. |
| 2012/0034914 | A1 * | 2/2012 | Zhou ..................... H01Q 1/246 455/426.2 |
| 2013/0077769 | A1 | 3/2013 | Hamaker et al. |
| 2015/0281435 | A1 | 10/2015 | Charlson |
| 2016/0309033 | A1 | 10/2016 | Woolsey et al. |

OTHER PUBLICATIONS

"Metaswitch Metasphere Messaging", Available at: <http://www.metaswitch.com/sites/default/files/Metaswitch-Metasphere-Messaging-R1.pdf>, Nov. 9, 2011, 2 pages.
"Non-Final Office Action", U.S. Appl. No. 14/686,536, dated Aug. 26, 2016, 21 pages.
"Notice of Allowance", U.S. Appl. No. 14/686,536, dated Dec. 23, 2016, 8 pages.
Belkin,"Translating Voice Mail to Text for Short Message Delivery", Ip.com Journal, May 15, 2002, 2 pages.
Koumpis,"An Advanced Integrated Architecture for Wireless Voicemail Data Retrieval", Proceedings of the 15th International Conference on Information Networking, Feb. 2001, 8 pages.
"International Preliminary Report on Patentability", Application No. PCT/US2016/027009, dated Aug. 16, 2017, 11 pages.
"Second Written Opinion", Application No. PCT/US2016/027009, dated May 11, 2017, 5 pages.

* cited by examiner

TEXT TRANSLATION OF AN AUDIO RECORDING DURING RECORDING CAPTURE

RELATED MATTERS

This application is a continuation of and claims priority to U.S. patent application Ser. No. 14/686,536 entitled "Call Pickup with Seemail" and filed Apr. 14, 2015, the disclosure of which is incorporated by reference herein in its entirety.

BACKGROUND

Answering machines local to a telephone can be used to record incoming calls that are left unanswered by a user. Sometimes the answering machine is connected between the telephone and a wall plug into a telecommunication system, while in other cases, the answering machine is integrated into a same device as the telephone. When an incoming call goes unanswered by the user, the answering machine answers the call, and gives the caller an opportunity to leave an audio recording. In the case where the answering machine includes a speaker, the audio can be played real-time through the speaker while it is being left by the caller (and recorded by the answering machine). This allows the user to listen to the message in real-time, and potentially intercept the call from the answering machine before the caller hangs up. As an alternative to an answering machine local to the telephone, some telecommunication systems provide a voicemail system using entities remote from the telephone. These remote entities manage redirecting unanswered calls to a capture mechanism, and maintain the recordings for user access. Due to its remote nature, a voicemail recording is typically inaccessible by the user until the recording has completed. Thus, a user not only loses the ability to hear a message as it is being left in real-time, but additionally loses the ability to intercept and/or answer the call during capture of the real-time message.

SUMMARY

This Summary is provided to introduce a selection of concepts in a simplified form that are further described below in the Detailed Description. This Summary is not intended to identify key features or essential features of the claimed subject matter.

Various embodiments provide real-time translation of a voicemail into a readable format as the voicemail is being recorded. In some cases, a system server records the voicemail by first answering a call from an originating device that goes unanswered by a destination device. Upon answering the call, the system server translates the recording, while it is being recorded, into a readable format. Alternately or additionally, the system server forwards portions of the readable format to the destination device. In turn, as the destination device receives portion(s) of the real-time translation, it can display the associated content, and/or update what is displayed as new portions are received. At times, the destination device provides additional call control that interrupts the voicemail while it is being recorded at the system server, and redirects the call to the destination device if the originating device is still connected.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments provide real-time translation of a voicemail into a readable format as the voicemail is being recorded. When a call initiated by an originating device to a destination device goes unanswered at the destination device, some embodiments answer the call at a system server. In some cases, the system server is configured to record an audio message received via the originating device. As the audio message is being recorded, the system server translates the audio into a readable format in real-time. As portions of the recording are translated, some embodiments forward the translated portions to the destination device, such as through an Internet Protocol (IP) connection or through Short Message Service (SMS) messages. The destination device receives the real-time translation and presents it to the user, sometimes updating what is presented as new portions of the real-time translation are received. Some embodiments provide an ability for the destination device to interrupt the voicemail while it is being recorded at the system server (with the origination device still connected to the call), and redirect the call to the destination device.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
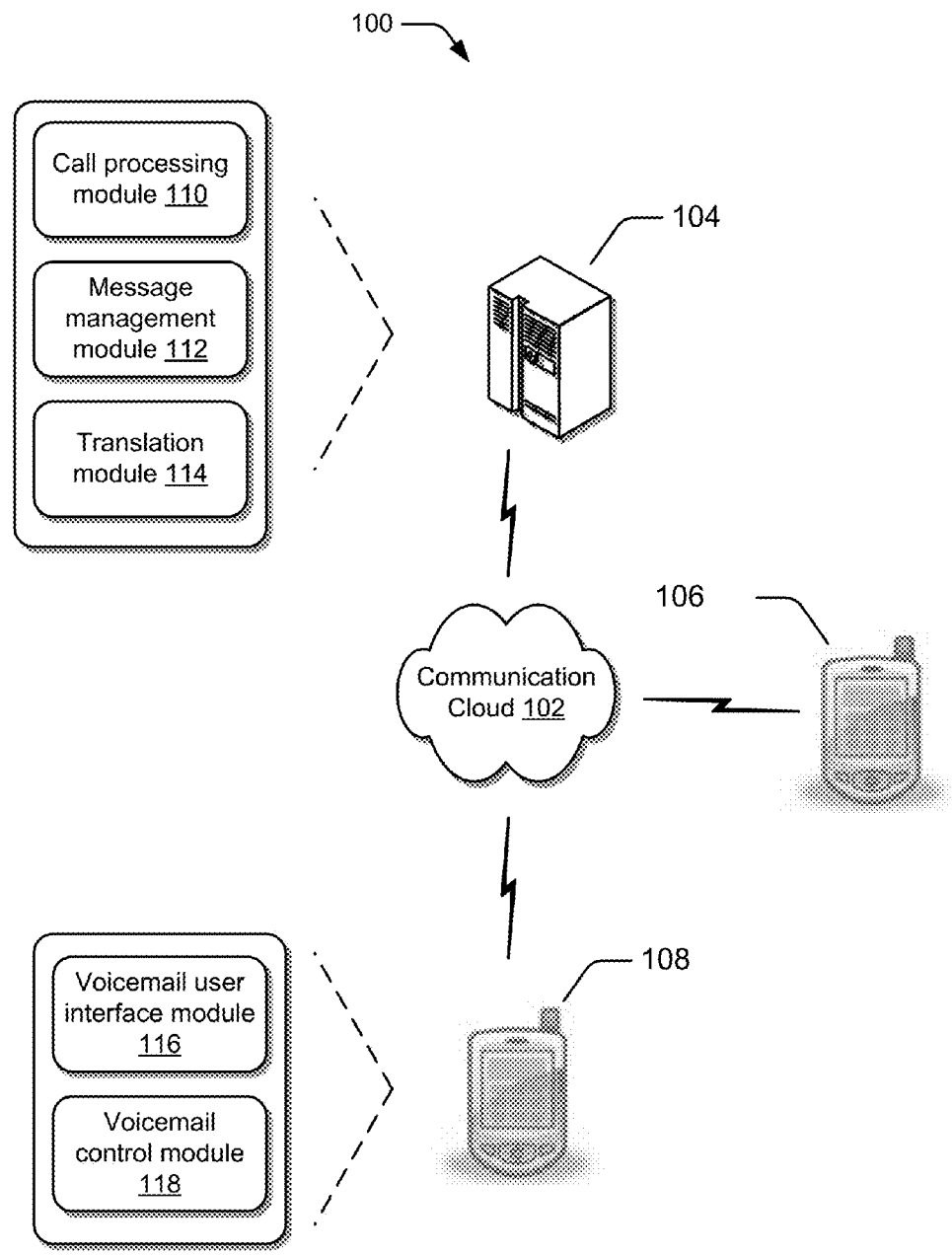
FIG. 1 is an illustration of an environment in an example implementation that is operable to perform the various embodiments described herein.

FIG. 1 is a schematic illustration of a communication system 100 which, in at least some embodiments, can be implemented over a communication network, represented here by communication cloud 102. Here, communication cloud 102 is used to generally represent any suitable type and/or combination of communication system(s), such as a packet-based Internet network, a cellular network, a computer network, and so forth. Among other things, communication cloud 102 represents plurality of interconnected elements configured to communicate data with other such elements, such as over the Internet by transmitting and receiving data in the form of Internet Protocol (IP) packets, transmitting and receiving data over cellular communication channels, etc. The elements shown in FIG. 1 include a system server 104, originating call device 106, and destination call device 108 that are interconnected with one another through communication cloud 102. It will of course be appreciated that many more elements make up the associated communication system than those explicitly shown. System server 104, originating call device 106, and/or destination call device 108 can communicate with one another, as well as other entities, by way of the communication cloud using any suitable techniques.

In at least some instances, in order for originating and destination call devices to communicate with another, a client executing on the originating call device acquires the IP address of the destination call device on which another client is installed. This can be done using an address look-up or any suitable technique.

Some Internet-based communication systems are managed by an operator, in that they rely on one or more centralized, operator-run servers for address look-up (not shown). In that case, when one client is to communicate with another, then the initiating client contacts a centralized server run by the system operator to obtain the destination device's IP address. Other approaches can be utilized. For example, in some server-based systems, call requests are received by the server and media is relayed by the server. In this instance, there is not an end-to-end connection between the clients, but rather a server in between for the communication that takes place.

In some cellular-based communication systems, the communication system is a wireless network distributed over land areas (i.e. cells), each served by a base station. When joined together, these cells provide a communication network that enables an originating device that interfaces with the cellular system to communicate with another device anywhere in the network via a base station.

In a public switched telephone network (PSTN), the communication system represents an aggregation of multiple circuit-switched telephone networks interconnected by switching centers and/or exchanges. The PSTN can include any combination and/or interconnection of systems, such as cellular networks, communication satellites, fixed line systems, etc.

System server 104 represents functionality that provides voicemail services to a device, such as destination call device 108. For example, destination call device 108 can be a subscriber to a communication system that utilizes system server 104 to implement voice messaging capabilities. Here, system server 104 includes call processing module 110, message management module 112, and translation module 114. While system server 104 is illustrated here as a single computing device, it is to be appreciated that this is merely for discussion purposes, and that in some embodiments, system server 104 includes multiple computing devices.

Call processing module 110 represents functionality that manages at least some call processing functionality associated with a subscriber to communication system 100. At times, call processing module 110 helps route call connections between originating call device 106 and destination call device 108. Alternately or additionally, call processing module 110 identifies when originating call device 106 initiates a call to destination call device 108, and can further discern when the initiated call is left unanswered at destination call device 108. In the case of an unanswered call, call processing module 110 can route the connection with originating call device 106 back to system server 104 for messaging services, such as those provided by message management module 112. Call processing module 110 can also route the connection with originating call device 106 back to destination call device 108 when the destination call device sends an indication to accept the unanswered call after it has been routed back to system server 104, as further described below.

Message management module 112 provides, among other things, voicemail capabilities to a subscriber. When a call to the subscriber is left unanswered, message management module 112 records an audio message from the calling device (such as originating call device 106), and further provides the subscriber with access to any audio messages stored for the subscriber. Message management module 112 can also be configured to provide portions of the audio message, as it is being recorded, to translation module 114. In some embodiments, message management module 112 stops recording an audio message from a calling device, as it is being left, while still maintaining a connection with the calling device. The connection with the calling device can then be transferred to the destination device, as further described below.

Translation module 114 provides audio-to-text translation of input audio, such as portion(s) of audio recordings managed by message management module 112. While translation module 114 is illustrated here as being a separate module as message management module 112, it is to be appreciated that this is merely for discussion purposes, and that translation module 114 can alternately be included within message management module 112 without departing from the scope of the claimed subject matter. The audio-to-text translations provided by translation module 114 can then be routed to the subscriber, sometimes as the associated audio message is still being recorded by message management module 112 and/or a connection with the calling device is still engaged. Routing the translated messages can be achieved in any suitable manner, such as over an Internet Protocol (IP) based connection, an SMS connection, and so forth.

Originating call device 106 represents a device with calling capabilities. Here, originating call device 106 establishes a connection to destination call device 108 via communication cloud 102. Alternately or additionally, originating call device 106 can receive incoming calls. In some cases, the connection between originating call device 106 and destination call device 108 is an indirect connection which uses additional entities, such as system server 104. In other cases, originating call device 106 and destination call device 108 have a direct connection between one another. While originating call device 106 is illustrated here as a wireless mobile device, it is to be appreciated that any suitable type of calling device can be used without departing from the scope of the claimed subject matter.

Destination call device 108 generally represents a subscriber device associated with communication system 100 and/or system server 104. As in the case of originating call device 106, destination call device 108 includes calling capabilities, such as initiating and/or receiving calls, and is the intended recipient of a call from originating call device 106. While destination call device 108 is illustrated as a wireless mobile device, it is to be appreciated that destination call device 108 can be any suitable type of device without departing from the scope of the claimed subject matter. Among other things, destination call device 108 includes voicemail user interface module 116 and voicemail control module 118.

Voicemail user interface module 116 represents functionality that enables a user to interface with voicemail service(s) provided by a communication system. For example, in some cases, voicemail user interface module 116 displays a user interface on a display device associated with destination call device 108. The displayed user interface can include selectable control(s) that provide a user with access to voicemail functionality, such as selecting a voicemail, initiating audio playback of a voicemail, pausing audio playback of a voicemail, deleting a voicemail, and so forth. The selectable control(s) can be activated in any suitable manner, such as through a touch screen interface, keyboard entries, soft-key selections, a mouse click, touchpad selection, and so forth. Alternately or additionally, voicemail user interface module 116 can be configured to simply receive keyboard entries (without display of an associated selectable control) as a way to interface with voicemail services. At times, voicemail user interface module 116 displays text translations of a voicemail, such as those provided by translation module 114. The display of text translations can occur automatically, in real-time as the text translations are received, or the text translations can be stored and displayed via voicemail user interface module 116 at a later point in time when a user makes a selection to display them. When voicemail user interface module 116 is displaying text translations in real-time (i.e. while the associated voice message is being recorded and/or the originating call device has not terminated the call), some embodiments provide the user with an ability (via a selectable control or otherwise) to interrupt the recording and transfer the call to the destination call device, as further described below.

Voicemail control module 118 represents functionality that interfaces with voicemail user interface module 116 and various functionality provided by system server 104, such as call processing module 110, message management module 112, and/or translation module 114. For example, consider an example of voicemail user interface module 116 displaying a selectable control associated with voicemail playback. When a user activates the voicemail playback control, some embodiments route an indication of the activation to voicemail control module 118. In turn, voicemail control module 118 interacts and/or manages interactions with system server 104 using the appropriate protocols, such as by initiating the appropriate message(s) to system server 104 over a wireless connection. In another example, voicemail user interface module 116 displays a selectable control associated with redirecting a communication connection from an active voicemail recording state at system server(s) 104 to an active call state with destination call device 108. When this control is activated, the user interface module sends an indication to voicemail control module 118 which, in turn, manages the interactions with system server(s) 104 to interrupt the active recording and/or redirect the connection to an active call state. Thus, among other things, voicemail control module 118 generally includes the appropriate logic to control and/or manage various voicemail features.

Figure 2:
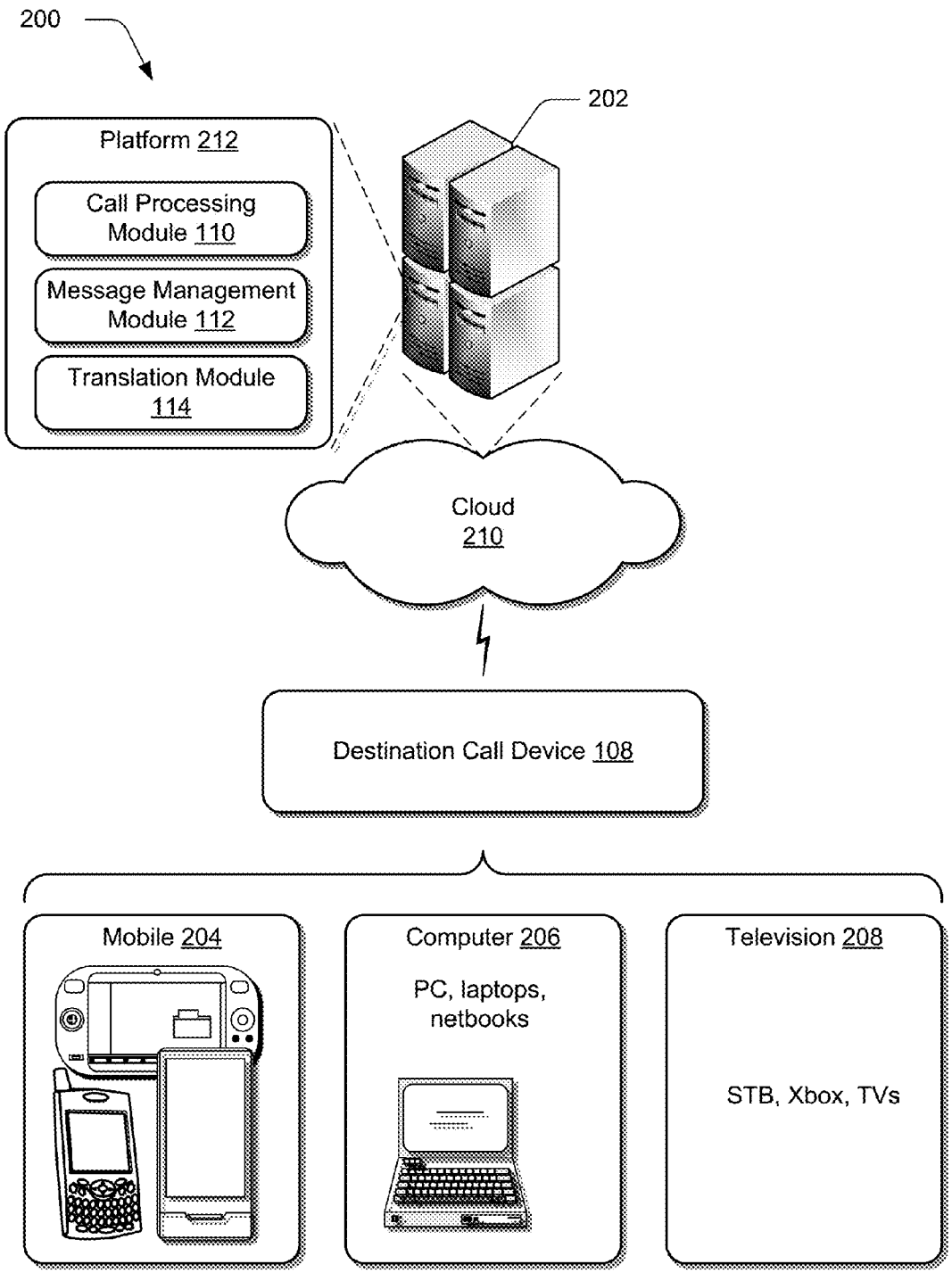
FIG. 2 is an illustration of an example implementation in accordance with one or more embodiments.

FIG. 2 illustrates an example system 200 generally showing central computing device(s) 202. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described, destination call device 108 may be configured in a variety of different ways, such as for mobile 204, computer 206, and television 208 uses. Each of these configurations has a generally corresponding screen size and thus destination call device 108 may be configured as one of these device classes in this example system 200. For instance, destination call device 108 may assume the mobile 204 class of device which includes mobile telephones, music players, game devices, and so on. Destination call device 108 may also assume a computer 206 class of device that includes personal computers, laptop computers, netbooks, tablet computers, and so on. The television 208 configuration includes configurations of device that involve display in a casual environment, e.g., televisions, set-top boxes, game consoles, and so on. Thus, the techniques described herein may be supported by these various configurations of the end-user terminal 104x and are not limited to the specific examples described in the following sections.

In some embodiments, central processing device(s) 202 include "cloud" functionality. Here, cloud 210 is illustrated as including a platform 212 for call processing module 110, message management module 112, and translation module 114. The platform 212 abstracts underlying functionality of hardware (e.g., servers) and software resources of the cloud 210 and thus may act as a "cloud operating system." For example, the platform 212 may abstract resources to connect end-user terminal 104x with other computing devices. The platform 212 may also serve to abstract scaling of resources to provide a corresponding level of scale to encountered demand for the services that are implemented via the platform 212. A variety of other examples are also contemplated, such as load balancing of servers in a server farm, protection against malicious parties (e.g., spam, viruses, and other malware), and so on. Thus, the cloud 210 is included as a part of the strategy that pertains to software and hardware resources that are made available to the end-user terminal 104x via the Internet or other networks.

Alternately or additionally, central computing device(s) 202 include call processing module 110, message management module 112, and/or translation module 114 as described above and below. In some embodiments, platform 212 and these modules can reside on a same set of servers, while in other embodiments they reside on separate servers. Here call processing module 110, message management module 112, and translation module 114 are illustrated as utilizing functionality provided by cloud 210 for interconnectivity with destination call device 108.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features described below are platform-independent, meaning that the techniques may be implemented on a variety of commercial computing platforms having a variety of processors.

Having described example operating environments in which various embodiments can be utilized, consider now a discussion of voicemail pickup in accordance with one or more embodiments.

Voicemail Translation and Call Pickup

Some communication system providers offer a subscriber voicemail as a service to record and playback messages left when a call goes unanswered. To provide this service, a centrally located device in the communication system monitors when a subscriber device receives an incoming call. If a call goes unanswered, the connection with the originating call device can be transferred from the subscriber device to a messaging center (remote from the subscriber device). Services provided by the messaging center can be integrated on the centrally located device, or on a separate device. The messaging center captures a finite audio recording in real-time from a user at the originating call device, and stores it for later access by the subscriber. However, when the call connection has been transferred from the subscriber device to the messaging center, the subscriber device no longer has direct access to the originating device in order to hear the message as it is being left in real-time.

Various embodiments provide real-time translation of a voicemail into a readable format as the voicemail is being recorded. To further illustrate, consider FIG. 3 which represents interactions between various devices in accordance with one or more embodiments. In this example, FIG. 3 generally captures exchanges between an originating call device (such as originating call device 106 of FIG. 1), a system server (such as system server 104 of FIG. 1), and a destination call device (such as destination call device 108 of FIG. 1). It is to be appreciated that, while not explicitly illustrated, various protocols and hand-shakings between these exchanges can be used to achieve these exchanges without departing from the scope of the claimed subject matter. Each vertical line is used to illustrate the actions of the associated entity over time.

To begin, an originating call device initiates a call to a destination call device in step 302. The originating call device can be any suitable type of device, such as a wireless mobile phone, a personal computer (PC) with Voice-over-Internet Protocol (IP) capabilities, and so forth. As discussed above, initiating the call can include various types of protocols and/or handshaking between the originating call device and various entities of the communication system it uses. This is generally signified through the use of a connecting dot at the system server line. As part of initiating a call, an initial connection is established between the originating call device and the destination call device. This can be facilitated by the system server and/or by other entities of the communication system. Here, the initial connection is used to notify the destination call device of the incoming call.

Upon the initial connection being established, the destination call device receives the initiated call and notifies the user in step 304. The user can be notified in any suitable manner, such as through an audible alert (i.e. one or more telephone rings), vibrating the destination call device, displaying a notification on an associated screen, etc. As in the case above, the destination call device can be any suitable type of device capable of sending and receiving calls.

At some point in time after the destination call device has been notified of the incoming call, the system server determines in step 306 that the call has gone unanswered. This can be determined in any suitable manner, such as through a timer and/or timeout mechanism. In some cases, the system server contacts and/or queries the destination call device to determine if the call is unanswered, such as by querying for a call state, querying for a call connection, and so forth. Alternately or additionally, the system server contacts and/or queries the originating call device to determine if the call is unanswered. These interactions are generally illustrated here as a two-way dashed line between the system server and the originating call device, and a two-way dashed line between the system server and the destination call device. Thus, multiple messages can be sent back and forth in order for the system server to determine when a call has gone unanswered. The call management process can be implemented, at least in part, using a call processing module, such as call processing module 110 of FIG. 1.

Responsive to determining that the call has gone unanswered at the destination call device, the system server transfers the connection with originating call device to a messaging center at step 308. Here, the messaging center is illustrated as being part of the system server. For simplicity sake, the terms messaging center and system server can be considered interchangeable in this discussion. However, the messaging center can be a separate entity from the system server without departing from the scope of the claimed subject matter. To transfer the connection, the system server can send and/or receive messages, queries, commands, and so forth with the originating call device, as well as the destination call device. As in the case above, these interactions are generally illustrated as a two-way dashed line between the system server and the destination call device, and a two-way dashed line between the system server and the originating call device. Any suitable number of messages, handshakes, protocol procedures, and so forth can be utilized. As in the case above, some embodiments the transfer the connection through the use of a call processing module, such as call processing module 110 of FIG. 1.

Figure 3:
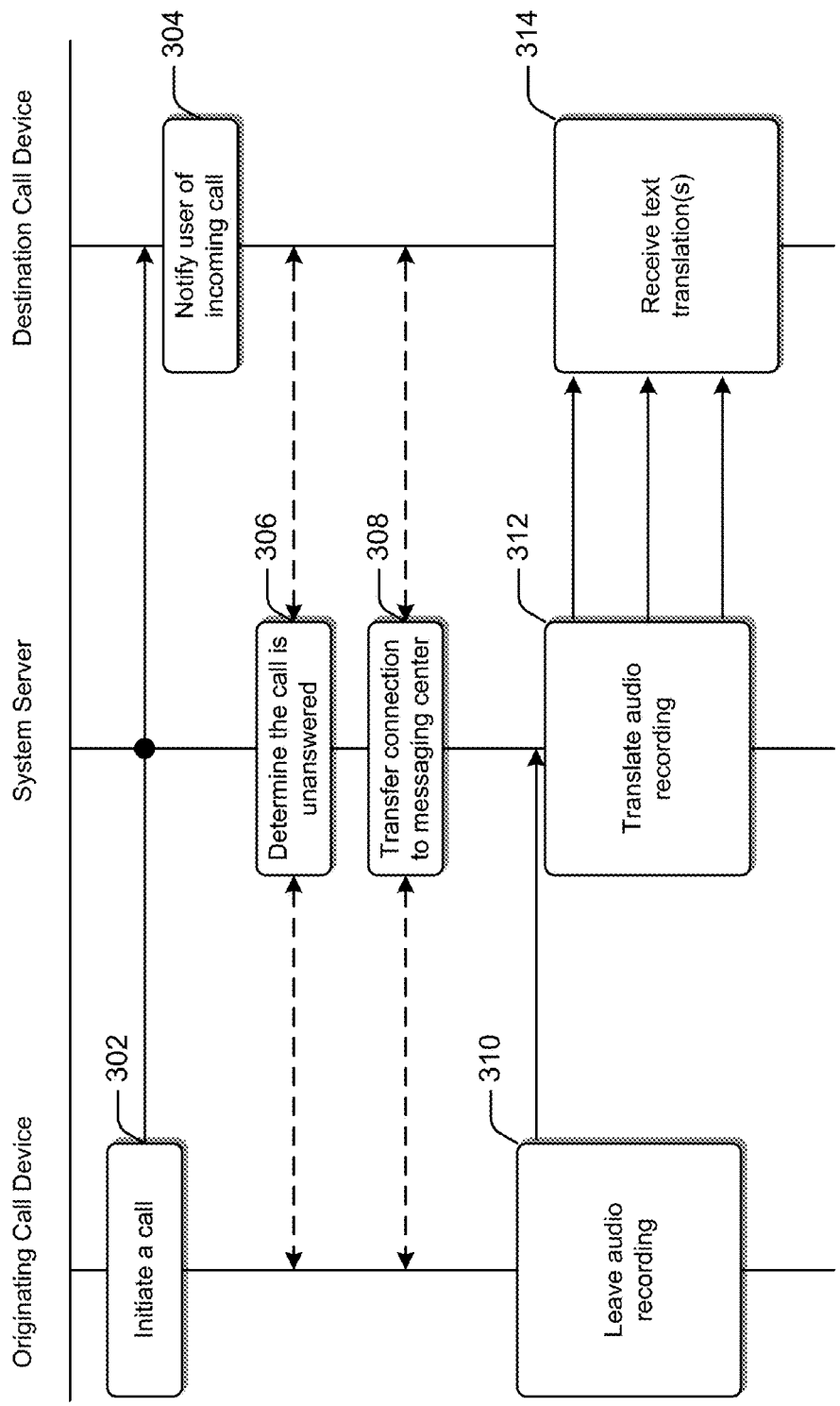
FIG. 3 is an illustration of an example bounce diagram in accordance with one or more embodiments.

Once the connection has been transferred to the messaging center, a user of the originating call device leaves an audio recording at the messaging center in step 310. In some embodiments, the ability for the originating call device to leave a voicemail is managed at the messaging center and/or the system server through the use of a voicemail management module, such as message management module 112 of FIG. 1. The length of the recording for the voicemail can be any arbitrary length of time. In some embodiments, while the user of the originating call device is actively leaving an audio message and/or the audio message is actively being recorded, the messaging center translates portions of the audio recording into text representation(s) in real-time, illustrated here as step 312. As each portion is translated, the respective text translation is sent to the destination call with the device. While FIG. 3 illustrates three translation sends (through the use of three directional arrows into destination call device), it is to be appreciated that this is merely for discussion purposes, and that any suitable number of translations can be sent without departing from the scope of the claimed subject matter. Further, any suitable type of connection can be used between the system server and the destination call device to transfer the text translations. For example, consider a case where the destination device is connected to the system server over an IP channel. In such a case, the translations can be sent over the IP channel. In other cases, when an IP connection does not exist between the destination call device and the system server, some embodiments use an SMS based approach, as further described below. In step 314, the destination call device receives the text translation(s).

Figure 4:
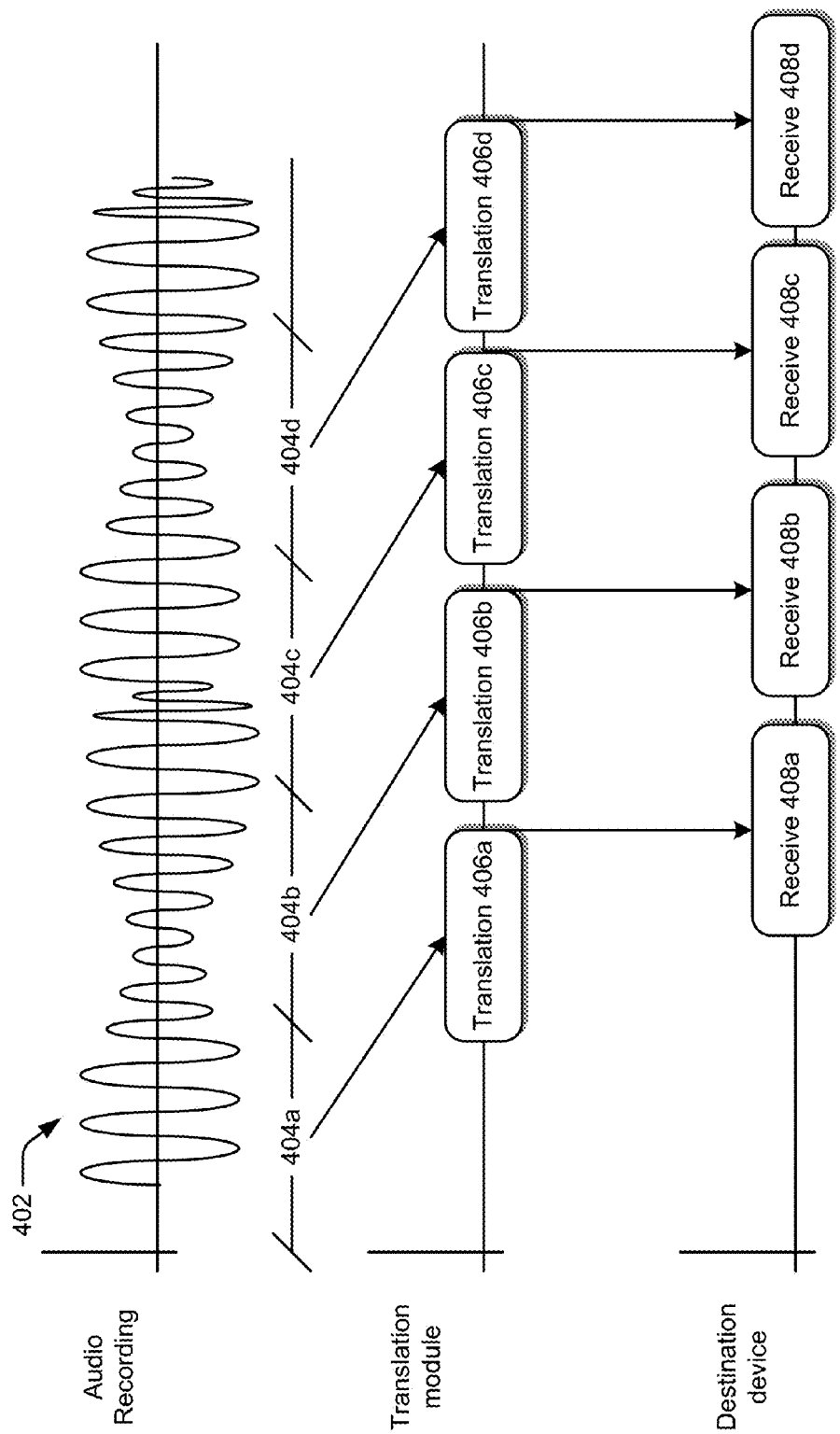
FIG. 4 is an illustration of an example implementation in accordance with one or more embodiments.

To further illustrate, consider FIG. 4, which includes three timelines: an audio recording timeline, a translation module timeline, and a destination device timeline. The audio recording timeline represents an audio capture in progress, such as an audio message being left, via an originating call device, as part of a voicemail system. The translation module timeline represents a sequence of events performed by a translation module, such as translation module 114 of FIG. 1. The destination device timeline represents a sequence of events as performed by a destination device, such as destination call device 108 of FIG. 1. Among other things, the ordering of these timelines is used to illustrate the relative order of execution of these actions to one another in time. These timelines are not intended to convey precise timing information, but rather the relative positioning between the sequences.

Here, audio 402 is divided into partitions 404*a-d*. While the illustration includes four partitions, it is to be appreciated that this is merely for discussion purposes, and that any suitable number of partitions can be generated. In this example, the partitions are illustrated as being uniform in length, but other implementations can utilize partitions of varying length from one another and/or partitions whose lengths dynamically change based upon the content contained within the associated audio. Partition 404*a* represents the first recorded portion of the audio 402, with partition 404*b* being the second recorded portion, partition 404*c* being the third recorded portion, and so forth.

The translation module first receives partition 404*a* as an input on which to perform a translation. In some embodiments, the translation module receives partition 404*a* as it is being recorded in real-time. Alternately or additionally, partition 404*a* is recorded in its entirety and then sent to the translation module. Upon receiving partition 404*a*, the translation module generates translation 406*a*. Any suitable type of translation can occur, such as an audio-to-text translation. In some embodiments, the generation of translation 406*a* can occur at the same time as additional related audio is being captured. In this example, translation 406*a* is being generated while partition 404*b* is being captured, translation 406*b* is being generated while partition 404*c* is being captured, and so forth. Similarly, translation 406*a* is sent to destination device before the translation module receives partition 404*b*. In this manner, the translation can be considered "real-time", in that the translation for the corresponding audio input is generated and sent to the recipient before the next audio input is received. Thus, receive 408*a* corresponds to the destination device receiving (and/or the translation module sending) translation 406*a* before translation 406*b* begins.

Figure 5:
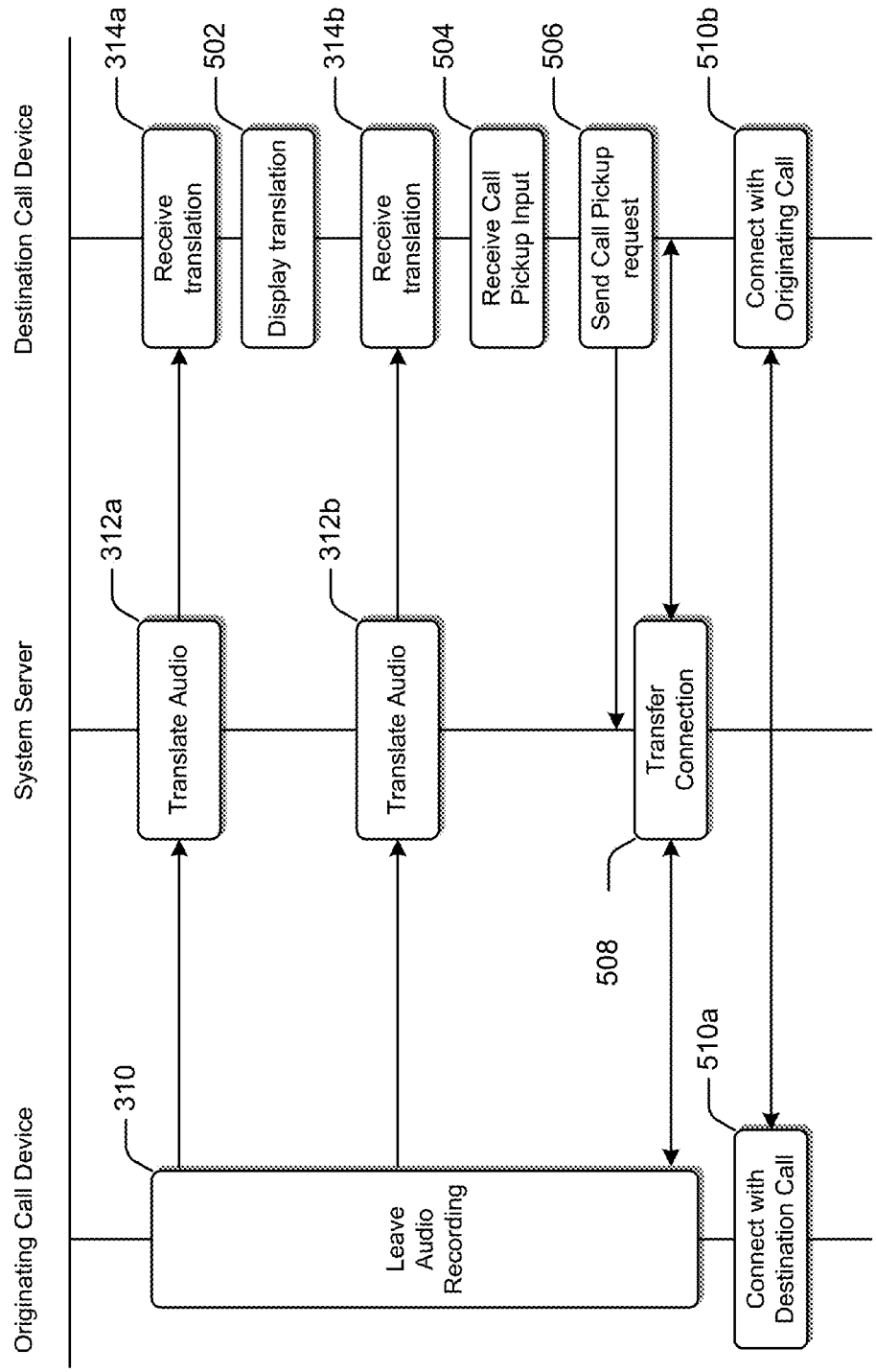
FIG. 5 is an illustration of an example bounce diagram in accordance with one or more embodiments.

Now consider FIG. 5, which is an example continuation of the interactions between the originating call device, system server, and destination call device of FIG. 3. Recall that in FIG. 3, after the call went unanswered at the destination call device, the originating call device began leaving an audio recording in step 310. As the originating call device leaves the audio recording, the system server translates the audio into text, and periodically sends the translations to the destination call device, which were generally represented as step 312 and step 314 in FIG. 3. Here, steps 312 and 314 have been further partitioned into steps 312*a* and 312*b*, and 314*a* and 314*b* respectively, to reflect the iterative process described with respect to FIG. 4. While FIG. 5 simply illustrates two partitions for these steps, it is to be appreciated that any suitable number of partitions and/or steps can be utilized in this example without departing from the scope of the claimed subject matter. Thus, in step 312*a*, the system server translates the first partition of audio, and in step 314*a*, the destination call device receives the first translation associated with the audio recording been left by the originating call device. Similarly, in step 312*b*, the system server translates the second portion of audio, while the destination call device receives the second translation in step 314*b*.

In some embodiments, a destination call device displays textual translations of an audio recording in progress. For example, in step 502, the destination call device displays the translation received in step 314*a*. Any suitable type of display mechanism can be utilized. At times, the destination call device can have a user interface associated with one or more voicemail services that displays the text translations as they are being received in steps 314*a* and 314*b*. Alternately or additionally, the user interface can include selectable controls that allow the user to direct functionality associated with voicemail. The selectable controls can be fixed controls that that are always displayed on the user interface, or can be dynamic controls that come and go on the user interface depending on what functionality is being accessed, depending on what state the voicemail is in, etc. Consider the above example where audio translations are being received at the destination call device while the originating call device is still actively leaving the associated audio recording. Some embodiments display a selectable control that allows a user of the destination call device to interrupt the active audio recording, and redirect the call connection to the destination call device (e.g. pick up the call), such as through the use of voicemail user interface module 116 and/or voicemail control module 118 of FIG. 1.

In step 504, the destination call device receives a call pickup input. This can be achieved in any suitable manner. In some cases, the input is received responsive to a user activating the selectable control displayed on the user interface, as further described above. Alternately or additionally, the input is received responsive to the user entering a keyboard command. In turn, the destination call device sends a call pickup request to the system server in step 506, thus allowing a user to read a text translation of a voice message as it is actively being left, and interrupt the recording by inputting one or more commands to the destination call device to answer and/or redirect the call being recorded.

Upon receiving the call pickup request, the system server transfers the call connection from voicemail to the destination call device in step 508. This can be achieved in any suitable manner, such as through the use of call processing module 110 and/or voicemail control module 118 of FIG. 1. Here, the system server is generally illustrated as having two-way connections with both the originating call device and the destination call device to signify that some embodiments employ various types of protocols and/or handshakings between the system server, the originating call device, and/or the destination call device to transfer the connection from the voicemail. For instance, in some embodiments, when the destination call device receives textual translations of an active audio recording in progress, the system server can additionally send an address and/or telephone number to the destination call device that is associated with the system server, as further described below. In other embodiments, the system server can send the destination call device a Uniform Resource Locator (URL) as an address to use when a data connection is present between the system server and the destination call device. To initiate a call pickup from voicemail, the destination call device may initiate a connection to the address and/or telephone number, such as by placing a call to the telephone number, or initiating HyperText Transfer Protocol (HTTP) messaging to the URL. Upon receiving a call and/or connection to the designated address and/telephone number, the system server replaces the originating call device connection with the messaging center with a connection to the destination call device. This is generally illustrated at steps 510*a* and 510*b*, where the originating call device connects with the destination call device, and vice versa.

Sending real-time translations of an audio recording to a destination call device gives the receiving user an opportunity to not only determine what the purpose of an associated call is, but additionally connect with the caller leaving the audio recording while they are still actively engaged with the call. Oftentimes the caller may be inaccessible once a voicemail has been left and the caller has terminated the connection. Providing real-time text translations to the recipient user improves the likelihood of the caller and the recipient to connect more efficiently.

Having described voicemail pickup in accordance with one or more embodiments, consider now a discussion of utilizing SMS services to provide the real-time translations.

Using SMS Services for Real-Time Voicemail Translations

Sometimes a user device can include multiple modes of connectivity. For example, a smartphone can have a connection into a cellular network, as well as a connection into the Internet over wireless local area network (i.e. Wi-Fi, WLAN, etc.). One advantage to an Internet connection is the relative ease of communication the smartphone can use to communicate large volumes of data with other devices over WiFi, WLAN, etc. Similarly, as part of a cellular network, some providers offer cellular data connections that are configured to transfer data efficiently. When these connections are readily available, the system sever can use these data channels to send text translations to the destination call device. However, when these modes of data transfer are unavailable or unsupported, an SMS connection can be used instead.

Among other things, SMS is a text messaging service that allows devices to exchange short text messages between one another. Some embodiments utilize the SMS messaging service to send audio text translations to a destination call device. Consider the previous example where a call from an originating call device goes unanswered at the destination call device. When the originating call device is connected to a voicemail service at the system server, the system server can first determine whether a dedicated data connection exists (i.e. IP channel, cellular data connection, etc.) to the destination call device. For instance, the system server can check to see if the destination call device has registered for audio translation services and/or whether the registration information indicates the availability of a data connection. Alternately or additionally, the system server can test to see if a data connection is valid by issuing a "ping" over the connection. If it is determined that a dedicated data connection does not exist, SMS messaging can be used instead to push the text translations down to the destination call device. In order to support voicemail call pickup via SMS messaging, some embodiments forward a pickup voicemail callback number to the destination call device.

In some embodiments, the system server manages a pool of numbers associated with a voicemail call pickup service, as further described below. When the system server decides to communicate text translations via SMS messaging, an unused number from the pool of numbers can be selected and assigned to the destination call device as a pickup voicemail callback number. For the purposes of this discussion, the selected number from the pool will be referred to as "N1". To maintain the association between N1 and the destination call device, the system server creates metadata information that describes the association. In some cases, the metadata includes additional information related to the voicemail in progress. Any suitable type of information can be stored, such as user ID information, voicemail duration, originating call addressing information, destination call an addressing information, call state information, and so forth. Once an association has been created, the server can forward N1 to the destination call device, and begin sending audio-to-text translations from an audio recording.

Some embodiments encode the SMS text message with information to indicate to the destination call device what type of content the SMS text message contains. By tagging the SMS text message, the system server can utilize an existing SMS infrastructure in a new manner. The tags allow the destination call device to identify the SMS text message as a voicemail message service SMS text message instead of a "routine" SMS text message, and subsequently redirect the SMS text messages from a standard SMS text message application to a voicemail message service application, such as voicemail user interface module 116 and/or voicemail control module 118 of FIG. 1. For instance, the first SMS text message associated with audio-to-text translation of a voicemail message can include a message type and/or code that indicates "start of call" that notifies the destination call device of an incoming audio recording translation. Alternately or additionally, the first message can include N1, which the destination call device identifies as an assigned pickup voicemail callback number. Upon identifying a "start of call", the destination call device displays a particular user interface directed towards voicemail management and/or display of the translated audio.

During the real-time translation of an audio recording, some embodiments use a message type of "intermediate transcription" for subsequent SMS text messages. This message type can be used to indicate the associated translation is part of an ongoing transcription. In addition to a message type, some embodiments additionally include a tag to again identify the SMS text message as being associated with a voicemail transcription. Any suitable number of "intermediate transcription" messages can be received by the destination call device. Upon completion of the audio transcription, some embodiments send an SMS text message to the destination call device that includes a message type of "call ended" to indicate the recording has completed and the originating call device connection has ended.

Figure 6:
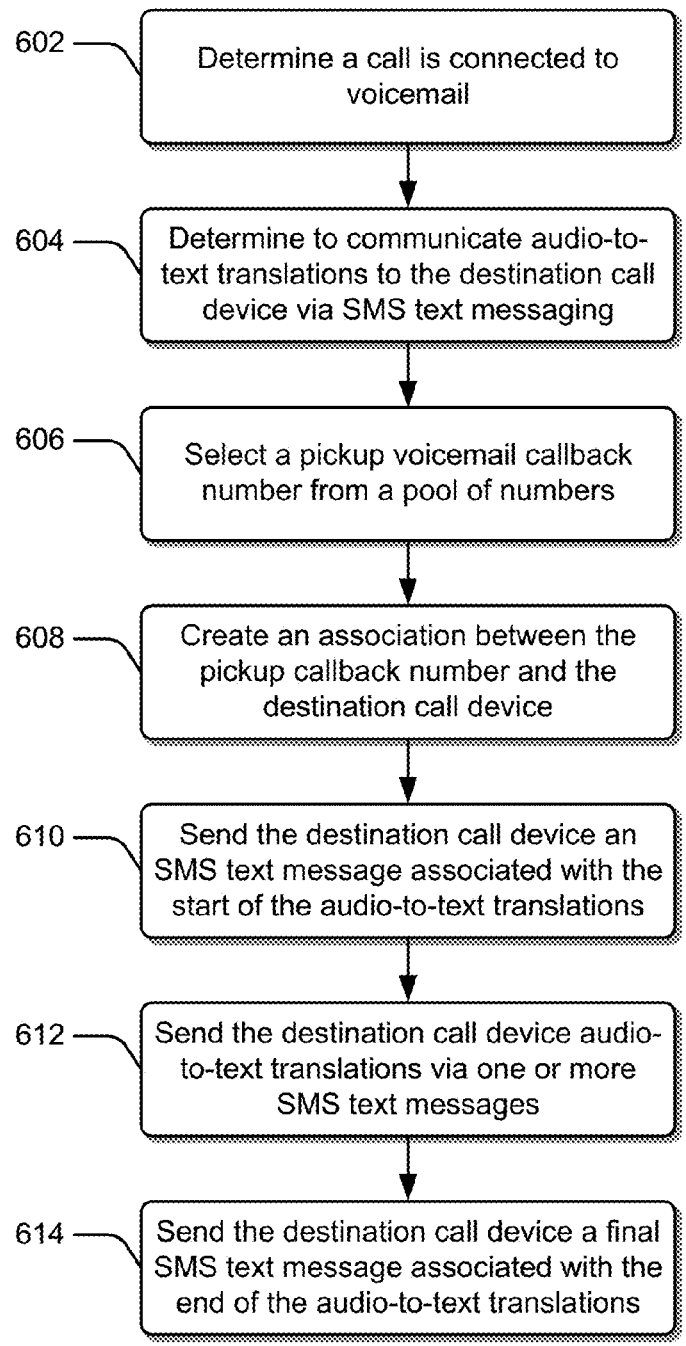
FIG. 6 is a flow diagram that describes steps in a method in accordance with one or more embodiments.

Consider FIG. 6, which is a flow diagram that describes steps in a method in accordance with one or more embodiments. The method can be implemented in connection with any suitable hardware, software, firmware or combination thereof. In at least some embodiments, aspects of the method can be implemented by a suitably configured software module, such call processing module 110, message management module 112, and translation module 114 of FIG. 1.

Step 602 determines a call is connected to voicemail, such as a call from an originating device that has gone unanswered at a destination call device. In some embodiments, a system server determines that a call from the originating call device is connected to voicemail by querying a call state at the originating call device and/or querying a call state the destination call device, as further described above. In some cases, the system server manages transferring the connection with the originating call device from the destination call device to a voicemail service.

Step 604 determines to communicate audio-to-text translations to the destination call device via SMS text messaging. In some cases, the system server analyzes registration information to determine whether the destination call device has a dedicated data connection. If the destination call device does not have a dedicated data connection, SMS text messaging can be used instead.

Responsive to determining to communicate via SMS text messaging, step 606 selects a pickup voicemail callback number from a pool of numbers as further described above and below. Step 608 creates an association between the pickup voicemail callback number and the destination call device and, such as through the use of metadata. Alternately or additionally, information related to the originating call device and/or voicemail state information can be included in the association.

Step 610 sends the destination call device an SMS text message associated with the start of the audio-to-text translations. As further described above, the SMS text message can sometimes include the pickup voicemail callback number, as well as a message type and/or a tag to indicate the start of a voicemail translation.

Step 612 sends the destination call device audio-to-text translations via one or more SMS text messages. Some embodiments tag the SMS text messages as being associated with a voicemail service and/or include a message type indicating the contents of the SMS text messages are intermediary content. Any suitable number of intermediary messages can be transmitted.

At the conclusion of a voicemail recording, as well as the audio-to-text to translations, step 614 sends the destination call device a final SMS text message associated with the end of the audio-to-text translations. At times, the final SMS text message includes a tag and/or a message indicating the end of a call. In some cases, the final SMS text message also includes the final audio-to-text translation of the associated audio recording, while in other cases, the control message and the translation information are sent separately. Upon the voicemail translation completing, the system server removes the association between N1 and the destination call device.

Thus, SMS text messaging can be used as an alternative data transfer mechanism when forwarding audio-to-text translations. Control messages and tags can be included in the SMS text messages as indicators to the destination call device that the incoming messages are associated with voicemail. This allows the system server to use an existing messaging infrastructure without modifications. Once it has received N1 as a pickup voicemail callback number, the destination call device can interrupt the audio recording by placing a call to N1 at any point during the translation process. By using N1 as a pickup voicemail callback number, the destination call device can also use existing infrastructure (with help from the system server) to intercept the call as it is currently in a voicemail state.

Figure 7:
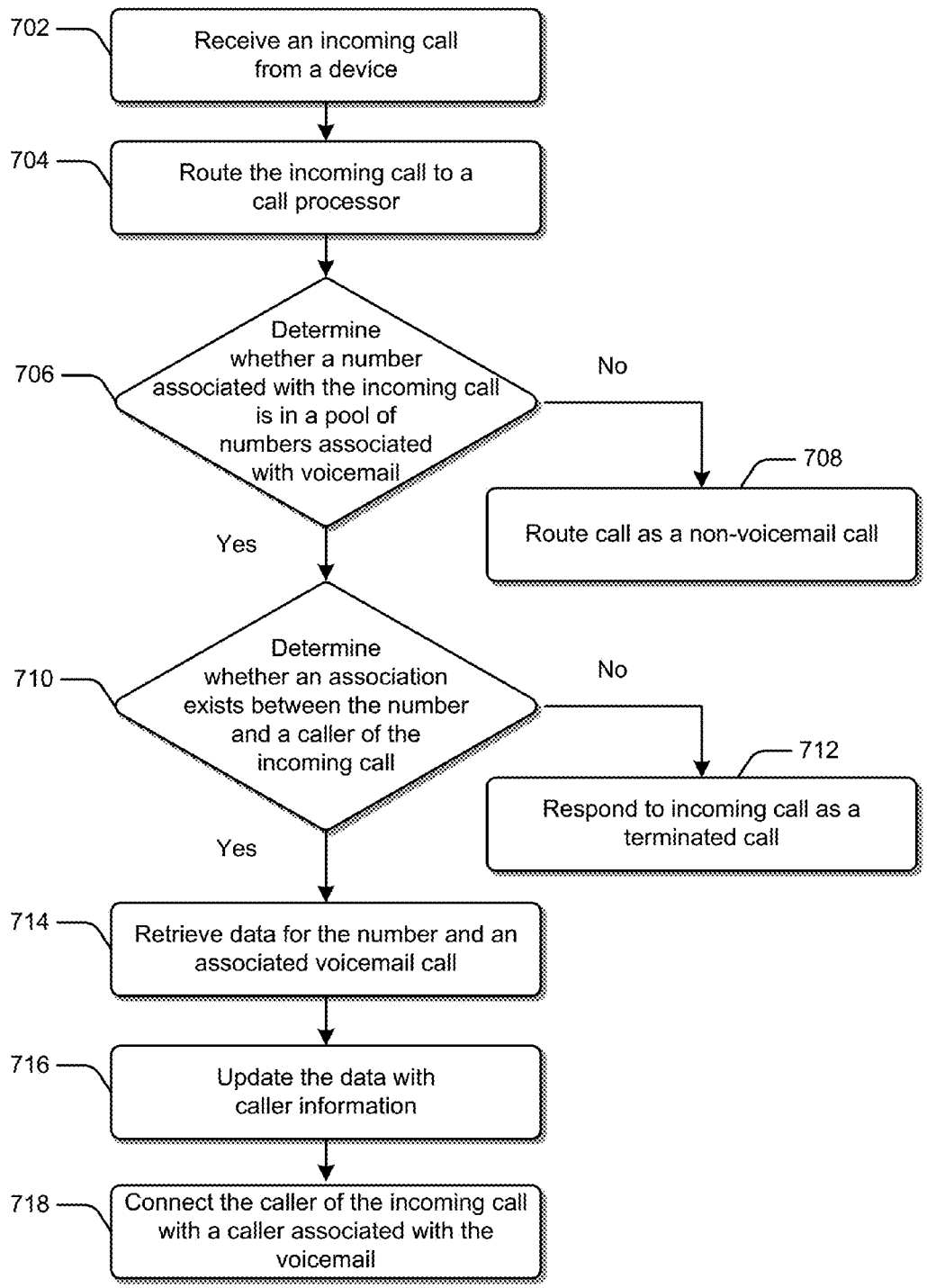
FIG. 7 is a flow diagram that describes steps in a method in accordance with one or more embodiments.

To further illustrate, consider FIG. 7, which is a flow diagram that describes steps in a method in accordance with one or more embodiments. The method can be implemented in connection with any suitable hardware, software, firmware or combination thereof. In at least some embodiments, aspects of the method can be implemented by a suitably configured software module, such as call processing module 110, message management module 112, and translation module 114 of FIG. 1.

Step 702 receives an incoming call from a device. Here, the device represents a destination call device that has missed answering a call from an originating call device. In an effort to pick up the call as it is being left in voicemail, the incoming call from the device is directed to a number previously given to the device by the system server, such as N1 described above. However, at this point, the incoming call is treated generically (i.e. it is not treated as being associated with voicemail). Responsive to receiving the incoming call, step 704 routes the incoming call to a call processor.

Step 706 determines whether a call associated with the incoming call is in a pool of numbers associated with voicemail. For instance, the system server first identifies the incoming call as being directed towards N1, and then determines whether N1 is in a pool of numbers associated with voicemail. If the number associated with the incoming call is not located in the pool of numbers, step 708 routes the call as a non-voicemail call. In other words, the call is treated in a standard call processing manner to connect the associated end parties. However, if the number associated with the incoming call is located in the pool of numbers, the incoming call is processed as a voicemail related call, as further described below.

Step 710 determines whether an association exists between the number and a caller of the incoming call (e.g. the device and/or the destination call device). This can be achieved in any suitable manner, such as by analyzing metadata. If no association exists, step 712 responds to the incoming call as a terminated call. For example, an association may no longer exist because the originating call device has completed recording an audio message, and terminated the connection. In this case, the device of the incoming call cannot intercept the voicemail, and the request to intercept the call (via a call to the number) is denied. However, if an association exists, the system server can proceed to connect the two end parties.

Step 714 retrieves data for the number (i.e. N1) and an associated voicemail call, such as information identifying the originating call device leaving the voicemail call. Step 716 updates the data with information associated with caller information identified in step 710 (i.e. the destination call device information). Once the data information has been updated, step 718 connects the caller of the incoming call with a caller associated with the voicemail (i.e. the originating call device). Thus, a destination call device can intercept a voicemail message being left by an originating call device using a pickup voicemail callback number.

Having considered using SMS text messaging to notify a destination call device of an active voicemail in progress, consider now a discussion of example devices in accordance with one or more embodiments.

Example System and Device

Figure 8:
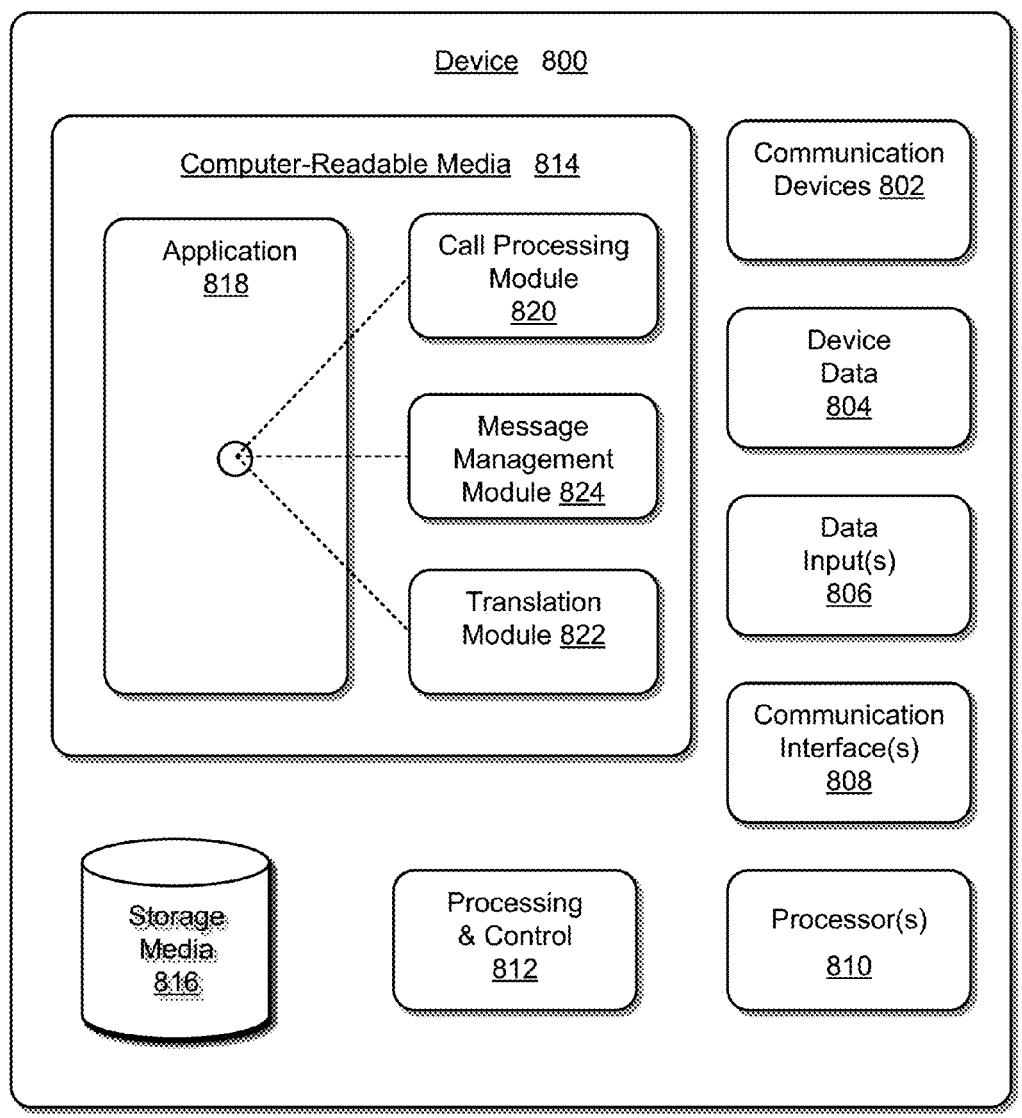
FIG. 8 illustrates various components of an example device that can be implemented as any type of computing device as described herein.
Figure 9:
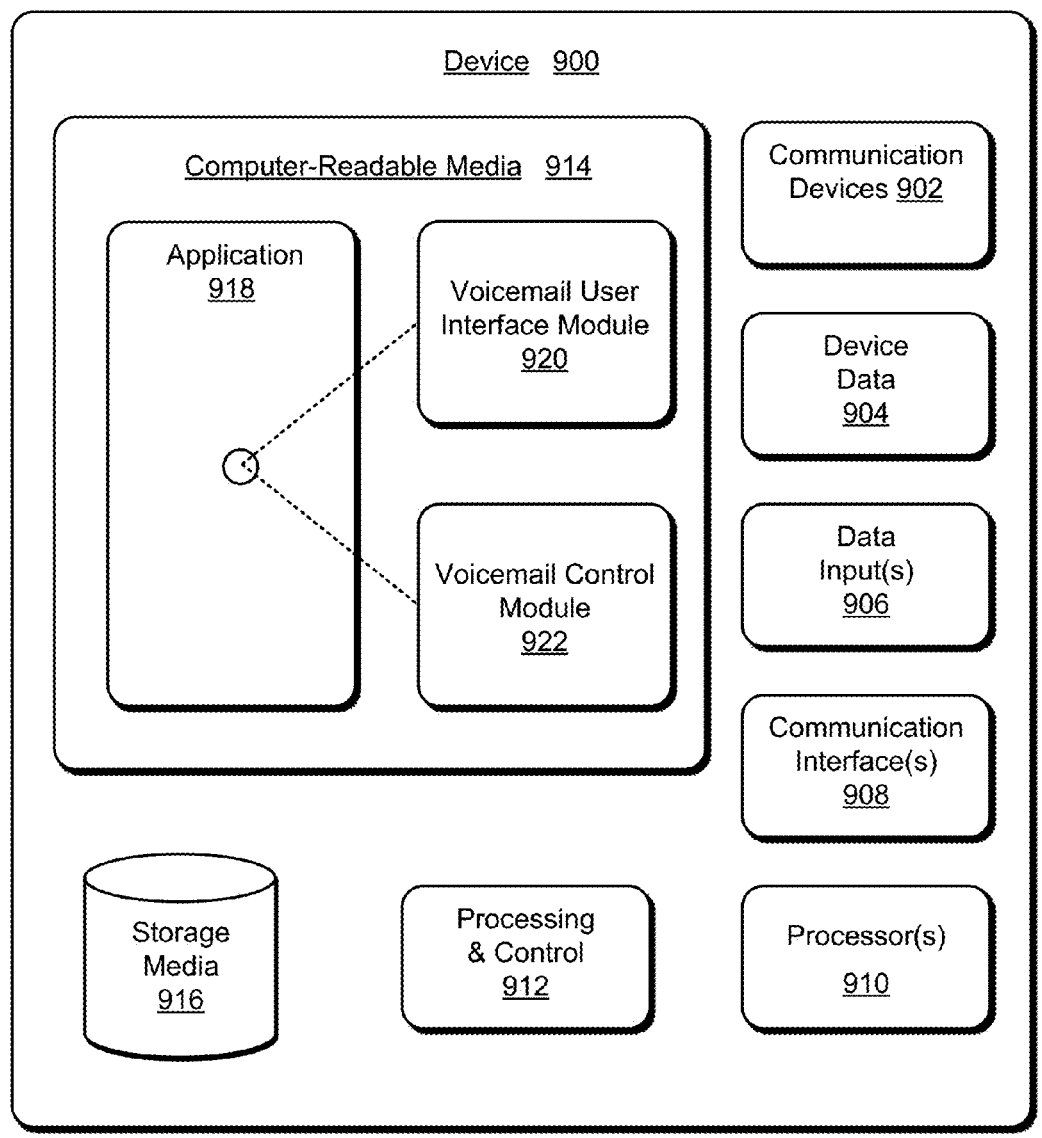
FIG. 9 illustrates various components of an example device that can be implemented as any type of computing device as described herein.

FIGS. 8 and 9 illustrate various components of example devices 800 and 900 that can be implemented as any type of computing device as described with reference to FIGS. 1-7 to implement embodiments of the techniques described herein. Device 800 is illustrative of an example system server device, such as system server 104 of FIG. 1, while device 900 is illustrative of a destination call device, such as destination call device 108 of FIG. 1. For the sake of brevity, these devices will be described together where applicable.

Components designated as 8XX are associated with device 800, while components designated as 9XX are associated with device 900.

Device 800/900 includes communication devices 802/902 that enable wired and/or wireless communication of device data 804/904 (e.g., received data, data that is being received, data scheduled for broadcast, data packets of the data, etc.). The device data 804/904 or other device content can include configuration settings of the device, media content stored on the device, and/or information associated with a user of the device. Media content stored on device 800/900 can include any type of audio, video, and/or image data. Device 800/900 includes one or more data inputs 806/906 via which any type of data, media content, and/or inputs can be received, such as user-selectable inputs, messages, music, television media content, recorded video content, and any other type of audio, video, and/or image data received from any content and/or data source.

Device 800/900 also includes communication interfaces 808/908 that can be implemented as any one or more of a serial and/or parallel interface, a wireless interface, any type of network interface, a modem, and as any other type of communication interface. The communication interfaces 808/908 provide a connection and/or communication links between device 800/900 and a communication network by which other electronic, computing, and communication devices communicate data with device 800/900.

Device 800/900 includes one or more processors 810/910 (e.g., any of microprocessors, controllers, and the like) which process various computer-executable instructions to control the operation of device 800/900 and to implement embodiments of the techniques described herein. Alternately or in addition, device 800/900 can be implemented with any one or combination of hardware, firmware, or fixed logic circuitry that is implemented in connection with processing and control circuits which are generally identified at 812/912. Although not shown, device 800/900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800/900 also includes computer-readable media 814/914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800/900 can also include a mass storage media device 816/916.

Computer-readable media 814/914 provides data storage mechanisms to store the device data 804/904, as well as various device applications 818/918 and any other types of information and/or data related to operational aspects of device 800/900. The device applications 818/918 can include a device manager (e.g., a control application, software application, signal processing and control module, code that is native to a particular device, a hardware abstraction layer for a particular device, etc.), and operating system, and so forth. The device applications 818/918 also include any system components or modules to implement embodiments of the techniques described herein.

Device applications 818 include call processing module 820, message management module 822, and translation module 824, while device applications 918 include voicemail user interface module 920 and voicemail control module 922. These modules are shown as software modules and/or computer applications. Alternately or in addition, these modules can be implemented as hardware, software, firmware, or any combination thereof.

Call processing module 820 is representative of software that provides an ability to manage call processing functionality associated with transferring connections between calling devices, receiving devices, and/or voicemail services. Message management module 822 is representative of software that provides an ability to record and access voicemail messages. Translation module 824 is representative of software that provides an ability to translate audio recordings in to textual representations.

Voicemail user interface module 920 is representative of software that is coupled to voicemail control module 922 that provides a user access to direct voicemail functionality via voicemail control module. Voicemail control module 922 is representative of software that manages protocols and/or handshaking into device 800 to access voicemail services.

Example Implementations

Example implementations described herein include, but are not limited to, one or any combination of one or more of the following examples:

A device for communicating text translations of an audio recording over a Short Message Service (SMS) connection, the device comprising: at least one processor; and one or more computer-readable storage memory devices comprising processor executable instructions which, responsive to execution by the at least one processor, are configured to enable the device to perform operations comprising: determining whether a connection associated with an originating call device initiating a call to a destination call device is connected to voicemail; determining to communicate the text translations associated with the audio recording, being left in voicemail via the originating call device, to the destination call device via SMS text messaging; selecting a pickup voicemail callback number from a pool of numbers; creating an association between the pickup voicemail callback number and the destination call device; sending the destination call device a first SMS text message indicating a start to the text translations, the first SMS text message comprising the pickup voicemail callback number; and sending the destination call device one or more additional text translations via one or more additional SMS text messages in real-time relative to the audio recording, each SMS text message of the one or more additional SMS text messages comprising at least one text translation of the text translations.

A device as recited above, wherein the first SMS text message includes a message type configured to indicate a start of call.

A device as recited above further configured to perform operations comprising: sending a final SMS text message that includes a message type configured to indicate a call ended when the audio recording has completed.

A device as recited above further configured to perform operations comprising: creating the association between the pickup callback number and the destination call device by creating metadata that includes the pickup callback number and information associated with the destination call device.

A device as recited above, wherein the metadata further comprises information associated with the originating call device.

A device as recited above further configured to perform operations comprising: receiving, from the destination device, an incoming call directed to the pickup callback number; determining to interrupt the audio recording; and connecting the originating call device and the destination call device.

A device as recited above further configured to perform operations comprising: generating the text translations from the audio recording.

A device for interrupting an originating call device that is recording an audio message to be used as voicemail for a destination call device, the device comprising: at least one processor; and one or more computer-readable storage memory devices comprising processor executable instructions which, responsive to execution by the at least one processor, are configured to enable the device to perform operations comprising: sending the destination call device an Short Messaging Service (SMS) text message comprising a pickup voicemail callback number; receiving an incoming call from the destination call device directed to the pickup voicemail callback number; determining whether a number associated with the incoming call is in a pool of numbers associated with voicemail services; responsive to determining the number is in the pool of numbers, determining whether an association exists between the number and the destination call device; responsive to determining an association exists, retrieving data for the number and the associated audio message being recorded by the originating call device; updating the data with information associated with the destination call device; and connecting the destination call device and the originating call device, the connecting comprising interrupting the audio message before the originating call device terminates an associated connection.

A device as recited above, wherein determining whether an association exists comprises analyzing metadata.

A device as recited above further configured to perform operations comprising: sending the destination call device one or more text translations via one or more additional SMS text messages in real-time relative to the audio message being recorded.

A device as recited above, wherein sending the one or more text translations in real-time relative to the audio message being recorded further comprises: receiving a first portion of the audio message; translating the first portion of the audio message into a textual representation; and sending the textual representation of the first portion to the destination call device before receiving a second portion of the audio message.

A device as recited above, wherein the second portion of the audio message is actively being recorded while the first portion is being translated.

A device as recited above, wherein sending the textual representation of the first portion further comprises sending the textual representation of the first portion using an SMS text message.

A device as recited above, wherein the SMS text message is encoded with a tag indicating it is associated with voicemail transcription.

A computer-implemented method for interrupting an active audio recording being left in voicemail by an originating call device and transferring the connection to a destination call device, the method comprising: determining whether a connection associated with the originating call device initiating a call to the destination call device is connected to voicemail leaving the active audio recording; sending the destination call device one or more text translations in real-time relative to the active audio recording; receiving an incoming call from the destination call device; determining whether the incoming call is associated with voicemail services; and responsive to determining the incoming call is associated with voicemail services, connecting the destination call device and the originating call device, the connecting comprising interrupting the active audio recording before the originating call device terminates an associated connection.

A computer-implemented method as recited above, wherein sending the destination call device one or more text translations further comprises sending the one or more text translations over Short Message Service (SMS) text messages.

A computer-implemented method as recited above, wherein each SMS text message of SMS text messages is encoded with a tag configured to indicate the respective SMS text message is associated with a voicemail service.

A computer-implemented method as recited above, wherein the destination call device comprises a wireless mobile device.

A computer-implemented method as recited above, wherein receiving the incoming call further comprises receiving the incoming call on a connection associated with a pickup voicemail callback number assigned to the destination call device by the computer.

A computer-implemented method as recited above, wherein determining whether a connection associated with the originating call device initiating a call to the destination call device is connected to voicemail further comprises at least: querying a call state associated with the originating call device; or querying a call state associated with the destination call device.

CONCLUSION

Various embodiments provide real-time translation of a voicemail into a readable format as the voicemail is being recorded. In some cases, a system server records the voicemail by first answering a call from an originating device that goes unanswered by a destination device. Upon answering the call, the system server translates the recording, while it is being recorded, into a readable format. Alternately or additionally, the system server forwards portions of the readable format to the destination device. In turn, as the destination device receives portion(s) of the real-time translation, it can display the associated content, and/or update what is displayed as new portions are received. At times, the destination device provides additional call control that interrupts the voicemail while it is being recorded at the system server, and redirects the call to the destination device if the originating device is still connected.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:
1. A device comprising:
at least one processor; and
one or more computer-readable storage memory devices comprising processor executable instructions which, responsive to execution by the at least one processor, are configured to enable the device to perform operations comprising:
  determining to communicate one or more text translations associated with an audio recording, while the audio recording from an originating call device is being captured in voicemail, to a destination call device via electronic communications over a communication network;
  sending a first electronic communication indicating a start to the one or more text translations to the destination call device and while the audio recording is being captured in voicemail; and
  sending a second electronic communication comprising at least a portion of the one or more text translations to the destination call device and while the audio recording is being captured in voicemail.

2. The device as recited in claim 1, wherein the first electronic communication includes a message type configured to indicate a start of call.

3. The device as recited in claim 1, wherein the operations further comprise sending an electronic communication that includes a message type configured to indicate that a call ended when the audio recording is completed.

4. The device as recited in claim 1, wherein the operations further comprise:
  sending, in the first electronic communication, a pickup voicemail callback number to the destination call device; and
  creating an association between the pickup voicemail callback number and the destination call device by creating metadata that includes the pickup voicemail callback number and information associated with the destination call device.

5. The device as recited in claim 4, wherein the metadata further comprises information associated with the originating call device.

6. The device as recited in claim 4, wherein the operations further comprise:
  receiving, from the destination call device, an incoming call directed to the pickup voicemail callback number;
  determining to interrupt the audio recording; and
  connecting the originating call device and the destination call device.

7. The device as recited in claim 1, wherein the operations further comprise sending the electronic communications over a Short Message Service (SMS) connection.

8. A device comprising:
  at least one processor; and
  one or more computer-readable storage memory devices comprising processor executable instructions which, responsive to execution by the at least one processor, are configured to enable the device to perform operations comprising:
    sending a first electronic communication comprising a pickup voicemail callback number to a destination call device;
    sending an additional electronic communication comprising a text translation of at least a portion of an audio message from an originating call device to the destination call device while the audio message is being captured in voicemail;
    receiving an incoming call from the destination call device directed to the pickup voicemail callback number; and
    connecting the destination call device and the originating call device by interrupting the audio message before the originating call device terminates an associated connection.

9. The device as recited in claim 8, wherein the operations further comprise:
  determining whether a number associated with the incoming call is in a pool of numbers associated with voicemail services;
  responsive to determining the number is in the pool of numbers, determining whether an association exists between the number and the destination call device;
  responsive to determining an association exists, retrieving data for the number and the associated audio message from the originating call device that is being captured; and
  updating the data with information associated with the destination call device.

10. The device as recited in claim 8, wherein the operations further comprise sending the destination call device the text translation over a Short Message Service (SMS) communication network.

11. The device as recited in claim 8, wherein the operations further comprise:
  sending the text translation of the audio message to the destination call device by:
    receiving a first portion of the audio message;
    translating the first portion of the audio message into a textual representation; and
    sending, using the additional electronic communication, the textual representation of the first portion to the destination call device before completing capture of a second portion of the audio message.

12. The device as recited in claim 11, wherein the second portion of the audio message is actively being recorded while the first portion is being translated.

13. The device as recited in claim 11, wherein said sending the textual representation of the first portion further comprises encoding the additional electronic communication with a tag indicating it is associated with voicemail transcription.

14. The device as recited in claim 13, wherein the additional electronic communication comprises a Short Message Service (SMS) text message.

15. A computer-implemented method comprising:
  determining to communicate one or more text translations of an audio recording, while the audio recording from an originating call device is being captured in voicemail, to a destination call device via electronic communications over a communication network;
  sending a first electronic communication comprising at least a portion of the one or more text translations to the destination call device and while the audio recording is being captured in voicemail;
  receiving an incoming call from the destination call device while the audio recording is being captured in voicemail; and
  connecting the destination call device to the originating call device in a call by interrupting the recording of the audio recording before the originating call device terminates a connection to voicemail.

16. The computer-implemented method as recited in claim 15, wherein said sending the first electronic communication further comprises sending a Short Message Service (SMS) text message.

17. The computer-implemented method as recited in claim 16, wherein the SMS text messages is encoded with an indication that the respective SMS text message is associated with a voicemail service.

18. The computer-implemented method as recited in claim 15, wherein the destination call device comprises a wireless mobile device.

19. The computer-implemented method as recited in claim 15, wherein said receiving the incoming call further comprises receiving the incoming call on a new connection associated with a pickup voicemail callback number that is assigned to the destination call device.

20. The computer-implemented method as recited in claim 15, wherein said determining to communicate the one or more text translations further comprises:
   determining whether the originating call device is connected to voicemail by:
      querying a call state associated with the originating call device; or
      querying a call state associated with the destination call device.

21. A device comprising:
   at least one processor; and
   one or more computer-readable storage memory devices comprising processor executable instructions which, responsive to execution by the at least one processor, are configured to enable the device to perform operations comprising:
      sending one or more electronic communications associated with text translations of an audio recording, while the audio recording from an originating call device is being captured in voicemail, to a destination call device over a communication network;
      receiving, from the destination call device and while the audio recording is being captured in voicemail, an incoming call directed to a callback number associated with interrupting the audio recording being captured in voicemail;
      determining to interrupt the audio recording; and
      connecting the originating call device and the destination call device using the callback number.

22. The device as recited in claim 21, wherein the operations further comprise:
   sending, in one of the one or more electronic communications, the callback number to the destination call device; and
   creating an association between the callback number and the destination call device by creating metadata that includes the callback number and information associated with the destination call device.

23. The device as recited in claim 21, wherein the operations further include creating an association between the callback number and the destination call device by creating metadata that includes the callback number and information associated with the destination call device, and wherein the metadata further includes information associated with the originating call device.

24. A device comprising:
   at least one processor; and
   one or more computer-readable storage memory devices comprising processor executable instructions which, responsive to execution by the at least one processor, are configured to enable the device to perform operations comprising:
      determining that a call initiated by an originating call device to a destination call device is unanswered at the destination call device;
      transferring a connection associated with the originating device from the destination call device to a messaging center to enable the originating call device to leave an audio recording in voicemail for the destination call device;
      receiving, from the destination call device and while the audio recording is being captured in voicemail, a call pickup request to interrupt the audio recording while the audio recording is being captured in voicemail; and
      establishing a call between the originating call device and destination call device by:
         interrupting the audio recording while it is being captured in voicemail; and
         transferring the connection associated with the originating device from the message call center to the destination call device.

25. A user device comprising:
   at least one processor; and
   one or more computer-readable storage memory devices comprising processor executable instructions which, responsive to execution by the at least one processor, are configured to enable the user device to perform operations comprising:
      displaying, in a user interface of the user device and while an audio recording from an originating call device is being captured in voicemail, one or more text translations of the audio recording, the audio recording associated with an unanswered call between the originating call device and the user device;
      receiving selection of a control associated with interrupting the audio recording while the audio recording is being captured in voicemail to pick up the unanswered call between the originating call device and the user device; and
      establishing, based on receiving selection of the control, a call connection between the user device and the originating call device to pick up the unanswered call.

26. The user device as recited in claim 25, wherein said establishing the call connection further comprises:
   establishing a connection with a voicemail call pickup service using an address received with one of the one or more text translations.

27. The user device as recited in claim 26, wherein the address comprises a pickup voicemail callback number.

28. The user device as recited in claim 25, wherein said operations further comprise:
   receiving a start call message indicating a start to the one or more text translations of the audio recording being captured in voicemail; and
   displaying, based on receiving the start call message, the one or more text translations as part of the user interface.

29. The user device as recited in claim 25, wherein said receiving selection of the control further comprises receiving input via a keyboard.

30. A computer-implemented method comprising:
   receiving, at a user device, a start call message indicating a start to one or more text translations of an audio recording being captured in voicemail, the audio recording associated with an unanswered call between an originating call device and the user device;
   displaying, based on receiving the start call message, a voicemail user interface that indicates that the audio recording is being captured and that includes a selectable control associated with interrupting the audio recording being captured in voicemail;

displaying the one or more text translations within the voicemail user interface;
receiving selection of the selectable control; and
establishing, based on receiving selection of the selectable control, a call connection to the originating call device.

31. The computer-implemented method as recited in claim 30, wherein said establishing the call connection comprises establishing the connection via an address comprising a Uniform Resource Locator (URL).

32. The computer-implemented method as recited in claim 30, wherein said displaying the one or more text translations within the voicemail user interface comprises displaying the one or more text translations while the audio recording is in progress of being captured in voicemail.

33. The computer-implemented method as recited in claim 30, wherein said receiving selection of the selectable control comprises receiving input via a touchscreen display associated with the user device.

\* \* \* \* \*